(12) United States Patent
LaVeigne et al.

(10) Patent No.: US 9,933,311 B2
(45) Date of Patent: Apr. 3, 2018

(54) BLACKBODY FUNCTION

(71) Applicants: Joseph D LaVeigne, Buellton, CA (US); Stephen W McHugh, Santa Barbara, CA (US)

(72) Inventors: Joseph D LaVeigne, Buellton, CA (US); Stephen W McHugh, Santa Barbara, CA (US)

(73) Assignee: Santa Barbara Infrared, Inc, Santa Barbara, CA (US)

( * ) Notice: Subject to any disclaimer, the term of this patent is extended or adjusted under 35 U.S.C. 154(b) by 850 days.

(21) Appl. No.: 14/249,354

(22) Filed: Apr. 10, 2014

(65) Prior Publication Data

US 2014/0314118 A1    Oct. 23, 2014

Related U.S. Application Data

(60) Provisional application No. 61/813,638, filed on Apr. 19, 2013.

(51) Int. Cl.
  *G01K 15/00*    (2006.01)
  *G01J 5/08*    (2006.01)
  *G01J 5/52*    (2006.01)

(52) U.S. Cl.
  CPC ............. *G01J 5/0881* (2013.01); *G01J 5/522* (2013.01)

(58) Field of Classification Search
  CPC .................................. G01J 5/0881; G01J 5/522
  See application file for complete search history.

(56) References Cited

U.S. PATENT DOCUMENTS

| | | | | |
|---|---|---|---|---|
| 3,487,216 A | * | 12/1969 | Haley | G01J 5/20 250/352 |
| 4,599,507 A | * | 7/1986 | Hishikari | G01J 5/522 219/483 |
| 5,265,958 A | * | 11/1993 | Ludlow | G01J 5/522 250/252.1 |

(Continued)

OTHER PUBLICATIONS

Edward F Cross et al: "Blackbody radiators for field calibration", Proceedings of SPIE, vol. 1540, Dec. 1, 1991 (Dec. 1, 1991), XP055128016, ISSN: 0277-786X, DOI: 10.1117/12.48779 * p. 757, paragraph 4 *.

(Continued)

*Primary Examiner* — Lisa Caputo
*Assistant Examiner* — Janice M Soto
(74) *Attorney, Agent, or Firm* — Gerald E. Linden

(57) ABSTRACT

A blackbody radiometric reference comprising a source plate or a target plate, metallic nanoparticles or other high emissivity coating disposed on the plate, and an intermediate coating such as paint. The plate may comprise copper, aluminum or composites thereof. Apparatus capable of functioning as a radiometric or thermometric reference. A preheater or weakly-coupled area may be disposed around or adjacent a highly thermally uniform area. A groove or perforations extending into a front surface of the source plate defining a weakly-coupled edge portion surrounding a thermally-controlled, optically-active area, and connected by bridges or structures thereto. An external probe may be located near the source plate for measuring ambient temperature, for compensating for ambient temperature or for radiative load on the blackbody.

20 Claims, 4 Drawing Sheets

(56) References Cited

U.S. PATENT DOCUMENTS

| | | | | | |
|---|---|---|---|---|---|
| 5,466,943 | A | * | 11/1995 | Green .................. | H01L 31/024 250/252.1 |
| 7,148,450 | B2 | * | 12/2006 | Lin .................... | F27B 17/0016 219/385 |
| 2011/0125444 | A1 | * | 5/2011 | Topham ................. | G01J 5/522 702/99 |

OTHER PUBLICATIONS

Keikhosrow Irani: "Variable temperature blackbody sources as primary standards", Proceedings of SPIE, vol. 6205, Apr. 17, 2006 (Apr. 17, 2006), pp. 620506-1- . . . -20, XP055127997, ISSN: 0277-786X, DOI: 10.1117/12.663955 * p. 17 *.

W. Becker et al: "Black fold deposits as absorbers for far infrared radiation", Physica Status Solidi (B), vol. 194, no. 1, Mar. 1, 1996 (Mar. 1, 1996), pp. 241-255, XP055128023, ISSN: 0370-1972, DOI: 10.1002/pssb.2221940123 * abstract * * p. 245 *.

V. G. Kravets et al: "Plasmonic blackbody: Strong absorption of light by metal nanoparticles embedded in a dielectric matrix", Physical Review B, vol. 81, No. 16, Apr. 1, 2010 (Apr. 1, 2010), pp. 16501-1-165401-9, XP055128196, ISSN: 1098-0121, DOA: 10.1103/PhysRevB.81.165401 * pp. 1-2: "1. Introduction"; pp. 2-3: "III Experimental Results"; Fig. 5a *.

* cited by examiner

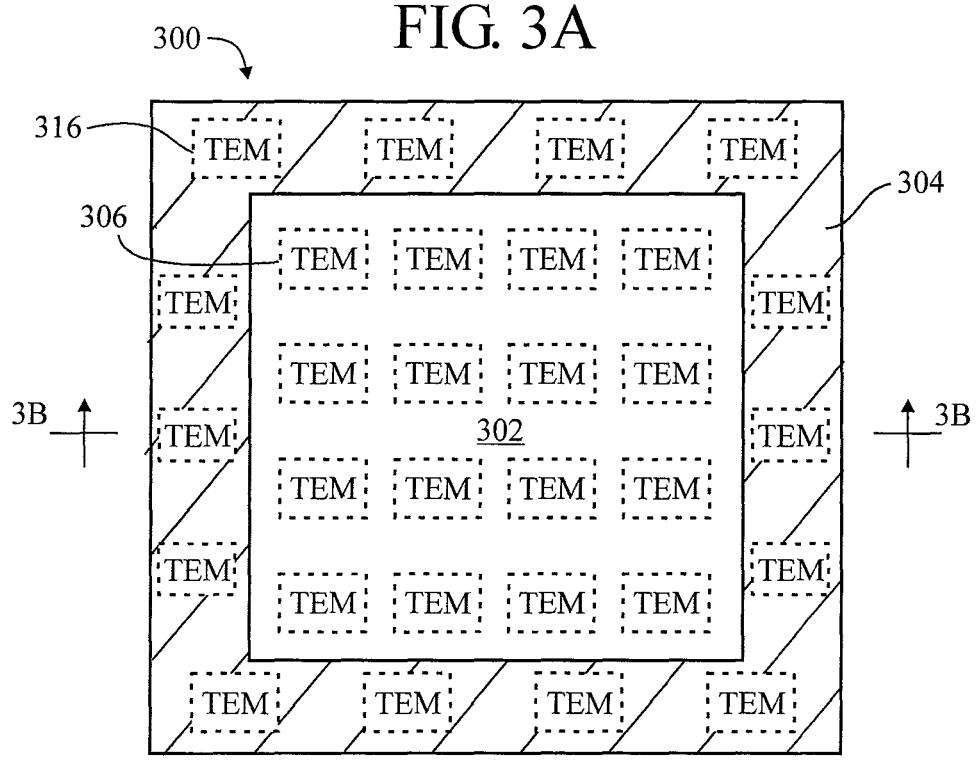
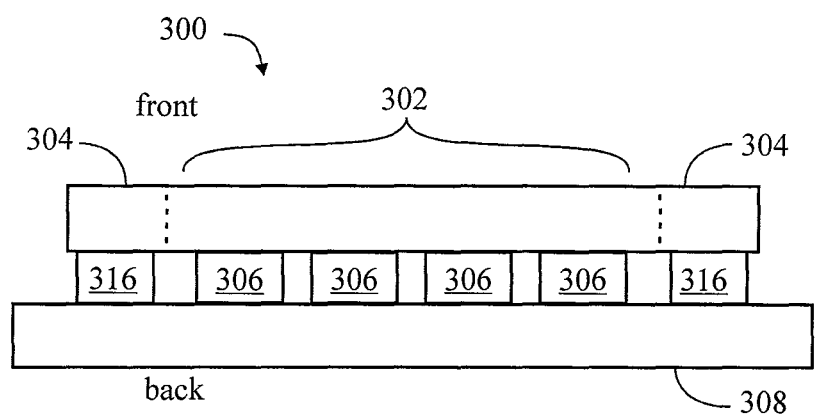

BLACKBODY FUNCTION

CROSS-REFERENCE(S) TO RELATED APPLICATIONS

Priority is claimed from U.S. 61/813,638 filed 19 Apr. 2013.

BACKGROUND

A black body (or blackbody) is an idealized physical body that absorbs all incident electromagnetic radiation, regardless of frequency or angle of incidence. A black body in thermal equilibrium (that is, at a constant temperature) emits electromagnetic radiation called black-body radiation. The radiation is emitted according to Planck's law, meaning that it has a spectrum that is determined by the temperature alone, not by the body's shape or composition. A black body in thermal equilibrium has two notable properties:

It is an ideal emitter: it emits as much or more energy at every frequency than any other body at the same temperature.

It is a diffuse emitter: the energy is radiated isotropically, independent of direction.

An approximate realization of a black surface is a hole in the wall of a large enclosure. Any light entering the hole is reflected indefinitely or absorbed inside and is unlikely to re-emerge, making the hole a nearly perfect absorber. The radiation confined in such an enclosure may or may not be in thermal equilibrium, depending upon the nature of the walls and the other contents of the enclosure.

Real materials emit energy at a fraction—called the emissivity—of black-body energy levels. By definition, a black body in thermal equilibrium has an emissivity of $\epsilon=1.0$. A source with lower emissivity independent of frequency often is referred to as a gray body. Construction of black bodies with emissivity as close to one (1) as possible remains a topic of current interest. A white body is one with a rough surface that reflects all incident rays completely and uniformly in all directions.

In astronomy, the radiation from stars and planets is sometimes characterized in terms of an effective temperature, the temperature of a black body that would emit the same total flux of electromagnetic energy.

Extended Area Blackbodies

Extended area blackbodies are commonly used for testing infrared cameras and other thermal detection devices. Blackbodies are used as thermal sources to provide a desired radiance or apparent temperature to a device under test or to illuminate a target with a known radiance or apparent temperature or to provide a desired temperature difference between the features in a target.

For an ideal blackbody with an emissivity of one (1), the only parameter required to calculate the radiance of the source is the temperature of the blackbody. For a system with non-unity emissivity, other factors must be considered in order to produce a desired radiance, including the emissivity and the radiance of the environment onto the surface of the source. Another factor to be considered is that the temperature of the surface of the source is needed, but the temperature may not be measured on the blackbody surface. Also, for extended area blackbodies, the temperature is typically measured in only one place, therefore the uniformity of the surface temperature must also be considered. An ideal blackbody would have a unity emissivity, and the same temperature across the entire surface as that of the point where the temperature is measured.

Extended area blackbodies are commonly used for testing infrared cameras and other thermal detection devices that have a field of view and require large uniform scenes or targets with a large extent. Cavity blackbodies or point sources rely mainly on their geometry (spherical, conical, reverse cone, tube) to create emissivity close to 1.0. These type of blackbodies are limited in size, are slow and do not have the uniformity and precise control required to test imaging systems. Extended area blackbodies provide the size and performance needed, but lack any geometric properties that enhance emissivity and rely on surface coatings to achieve high emissivity.

SUMMARY

It is a general object of the invention to provide improvements to the function of extended area blackbodies, and systems incorporating the blackbodies.

According to some embodiments (examples) of the invention, generally, a blackbody radiometric reference may comprise a source plate or a target plate, metallic nanoparticles or other high emissivity coating disposed on the plate, and an intermediate coating such as paint. The plate may comprise copper, aluminum or composites thereof. Apparatus capable of functioning as a radiometric or thermometric reference. A pre-heater or weakly-coupled area may be disposed around or adjacent a highly thermally uniform area. A groove or perforations extending into a front surface of the source plate defining a weakly-coupled edge portion surrounding a thermally-controlled, optically-active area, and connected by bridges or structures thereto. An external probe may be located near the source plate for measuring ambient temperature, for compensating for ambient temperature or for radiative load on the blackbody.

According to some embodiments (examples) of the invention, a radiometric reference may comprise a plate which is a source plate or a target plate, characterized by: a coating comprising metallic nanoparticles or other high emissivity coating disposed on the plate. The nanoparticles may have a size of approximately 10-500 Angstroms; and the coating may have an overall thickness of less than 10 μm. An intermediate coating may be disposed between the plate and the coating of metallic nanoparticles or other high emissivity coating. The intermediate coating may comprise one of paint, a laminate, a deposited film, anodization, and the like, and may have a thickness of approximately 1-10 μm. The plate may comprise copper, aluminum or composites thereof. The plate may be a target plate comprising a plurality of openings.

According to some embodiments (examples) of the invention, apparatus capable of functioning as a radiometric or thermometric reference may comprise: a source plate comprising a highly thermally-uniform area and a pre-heater area or a weakly-coupled area disposed around the edges of or laterally adjacent to the highly-uniform area. Thermoelectric modules may be disposed on the source plate in both the highly-uniform area and the pre-heater area. A groove or perforations may extend into a front surface of the source plate to define a thermally-controlled, optically-active area surrounded by a weakly-coupled edge portion of the source plate which is connected by bridges to the optically-active area at the back of the source plate. The apparatus may comprise a reference probe extending to a first position within the source plate; a pre-heater plate (520) disposed adjacent to the source plate; and at least one probe to be calibrated extending through the pre-heater plate into the source plate, and extending substantially to the first position within the source plate. The apparatus may further comprise structures with low thermal conductance joining the preheater plate to the source plate, these structures may comprise stainless steel tubes.

According to some embodiments (examples) of the invention, a radiometric reference may comprise: a source plate; thermal sources (TEM); a control probe associated with the source plate; an external probe located near the source plate for measuring ambient temperature; and means for compensating for the ambient temperature.

According to some embodiments (examples) of the invention, a method of operating a radiometric reference may comprise: measuring both the temperature of a blackbody and that of the ambient environment; and calculating a reasonably accurate surface temperature for the blackbody. The method may further comprise at least one of: compensating for ambient temperature; and compensating for radiative load on the blackbody.

Other embodiments (examples) may be disclosed, and may be claimed. Some interim products may be disclosed, and may be claimed.

The invention(s) described herein may relate to industrial and commercial industries, such as systems utilizing extended area blackbodies, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be exaggerated or drawn not-to-scale; others may be omitted, for illustrative clarity. Any text (legends, notes, reference numerals and the like) appearing on the drawings are incorporated by reference herein.

When terms such as "left" and "right", "top" and "bottom", "upper" and "lower", "inner" and "outer", or similar terms are used in the description, they may be used to guide the reader to orientations of elements in the figures, but should be understood not to limit the apparatus being described to any particular configuration or orientation, unless otherwise specified or evident from context. Different "versions" of elements may be referenced by reference numerals having the same numbers (###) followed by a different letter suffix (such as "A", "B", "C", or the like), in which case the similar elements may be inclusively referred to by the numeric portion (###) only of the reference numeral.

Although the invention may be illustrated in the context of various exemplary embodiments, it should be understood that it is not intended to limit the invention to these particular embodiments, and individual features of various embodiments may be combined with one another.

Figure 1:
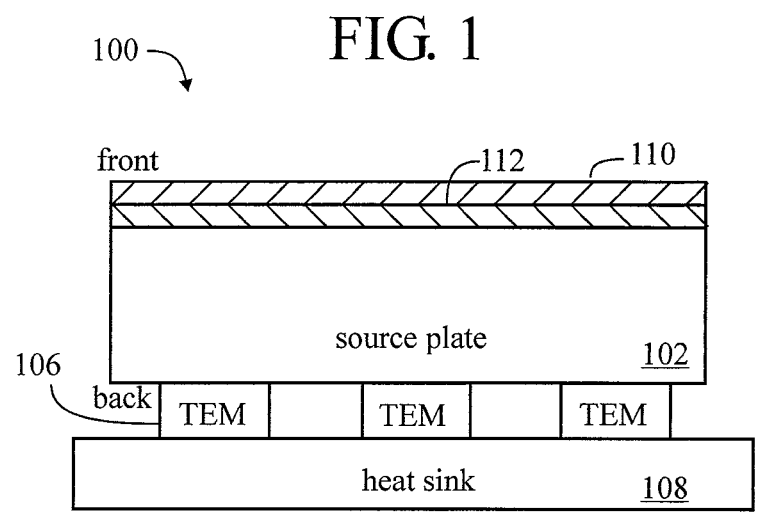

FIG. 1 is a cross-sectional view of a blackbody.

Figure 2A:
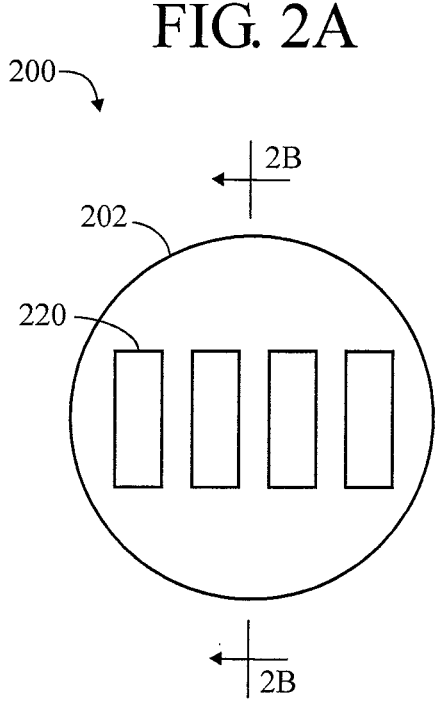
Figure 2B:
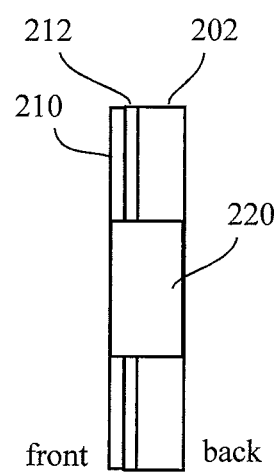

FIG. 2A is a frontal view, and FIG. 2B is a cross-sectional view of a target plate.

FIG. 3A is a frontal view, and FIG. 3B is a cross-sectional view of a source plate having an independent thermal control area at its peripheral edge.

Figure 4A:
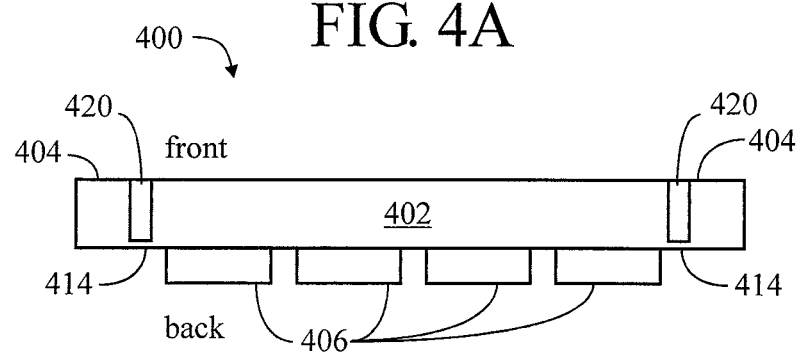

FIG. 4A is a cross-sectional view of a source plate having a groove extending around its peripheral edge.

Figure 4B:
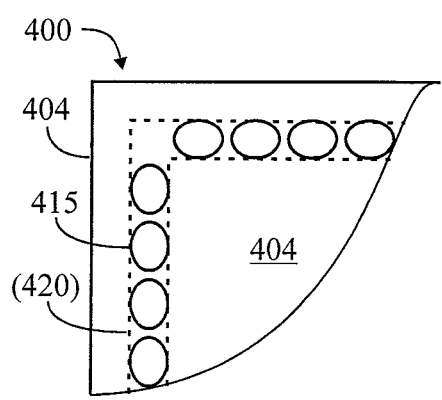

FIG. 4B is a frontal view of a source plate having perforations extending around a peripheral portion thereof.

Figure 5:
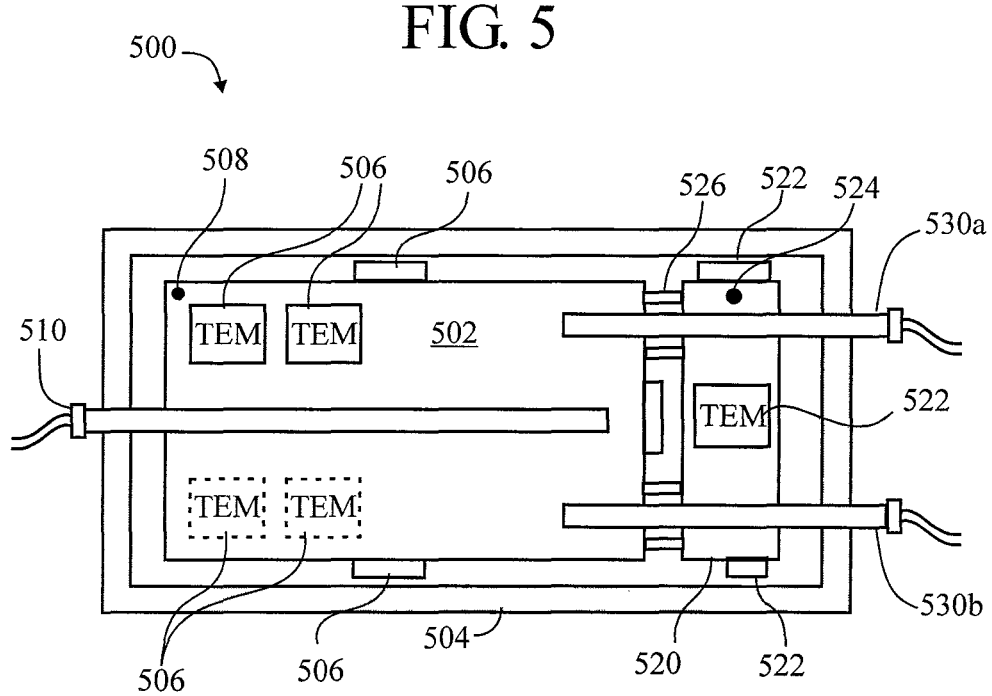

FIG. 5 is a diagram of a setup for thermometric calibration.

Figure 6:
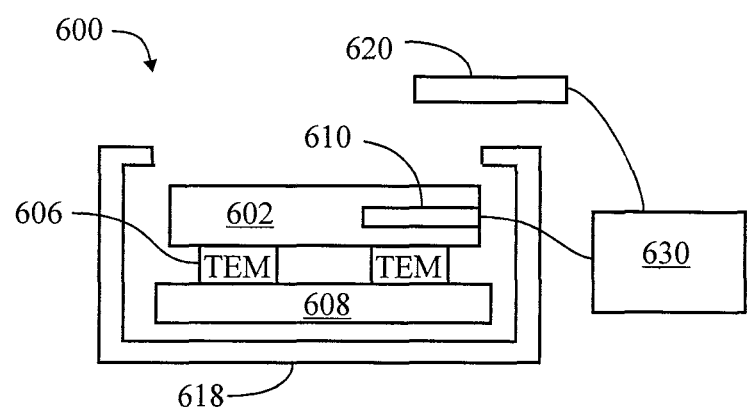

FIG. 6 is a cross-sectional view of a setup for compensating for ambient temperature.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

In the following descriptions, some specific details may be set forth in order to provide an understanding of the invention(s) disclosed herein. It should be apparent to those skilled in the art that these invention(s) may be practiced without these specific details.

Headings (typically underlined) may be provided as an aid to the reader, and should not be construed as limiting. Any dimensions and materials or processes set forth herein should be considered to be approximate and exemplary, unless otherwise indicated.

Reference may be made to disclosures of prior patents, publications and applications. Some text and drawings from those sources may be presented herein, but may be modified, edited or commented to blend more smoothly with the disclosure of the present application.

This document describes some improvements to the function of extended area blackbodies including improved emissivity, uniformity and surface temperature control, all of which may lead to improved radiometric accuracy.

As used herein, the terms "radiometric reference", "thermometric reference", "blackbody" and "source plate" may be used interchangeably, it being understood that their character may readily be ascertained from the environment (or embodiment, or overall apparatus) within which they are used. In some embodiments disclosed herein, apparatus incorporating the source plate may be capable of functioning as a radiometric or thermometric reference. Typically, a radiometric reference would be controlled (for temperature), such as in the form of a source plate (such as in FIG. 1). Other embodiments may include a radiometric reference, such as in the form of a target (such as in FIG. 2), that is not temperature-controlled.

Emissivity

A high emissivity (as close to unity (1.0), as possible) is a desired feature of a blackbody used for calibration. The higher the emissivity, the less impact the environment will have, and the easier compensation for the environment becomes. For a unity emissivity, no compensation needs to be made for environmental irradiance onto the source. A source with emissivity of 0.995 will have 5 times less influence from the environment than one with emissivity of 0.975. Typical commercial extended area blackbodies have a surface coated with a carbon based paint, producing an emissivity of near 0.975 in the MWIR (mid-wavelength infrared range; 3-5 micron wavelength) and 0.955 in the LWIR (long-wavelength infrared range; 8-12 micron wavelength).

FIG. 1 is a cross-sectional view of an extended area blackbody 100 comprising a source plate 102. The source plate 102 may be square, may comprise a material with high thermal conductivity, such as copper, aluminum, composites thereof, or other materials, may have a surface area of approximately 25-900 cm$^2$ (4-144 in$^2$), may have a thickness of 0.6 cm-1.2 cm (¼"-½"), and may have a number of thermal sources 106 such as resistive heaters, thermoelectric modules (TEM), etc. disposed on its back (bottom, as viewed) surface. Some designs, particularly those using thermoelectric modules may also incorporate a heat sink 108, as shown. Source plates with buried heaters (not shown) may be thicker, such as approximately 2.5 cm (1") thick, or more. The source plate 102 may be other than square, and may be formed of materials other than those which are explicitly recited. The blackbody 100 may be temperature controlled.

A front surface of the source plate 102 may be covered with a coating (or layer) 110 comprising metallic nanoparticles (or other high emissivity coating). When these particles are smaller than the wavelength of the electromagnetic (EM) waves (for example in the visible or IR portion of the EM spectrum), they exhibit anomalous absorption. A coating of these particles (or other high emissivity coating) may produce a surface with very high emissivity. The layer 110 of nanoparticles can be directly applied to a surface of the source plate 102.

The nanoparticles 110 on the optically-active (top, as viewed) front surface of the source plate 100 may be metallic, such as aluminum or silver, may have a size (diameter) of approximately 10-500 Angstroms, and the layer (coating) of nanoparticles may have a typical overall thickness of approximately nearly (almost) zero (such as one particle, or only a few particles thick) to 10 μm—or, simply, less than 10 μm—although thicker coatings (such as, up to 15 μm) may be used in some cases.

An intermediate coating (or layer) 112 of high (e.g. >80%), but not near unity emissivity material such as paint may (optionally) be disposed on the front surface of the source plate 100 between the source plate (base) 102 and the layer 110 of nanoparticles.

The intermediate coating 112 may improve adhesion of the nanoparticles 110 and may also limit the degradation of the surface emissivity should the nanoparticle coating be damaged during use. The nanoparticle coating 110 may be applied after the intermediate coating 112 has cured, or may be applied prior to curing of the intermediate coating 112 in order to improve adhesion of the nanoparticles. The intermediate coating 112 may be texturized to further improve adhesion of the nanoparticles 110. The intermediate coating 112 is optional, and may simply be paint, and should be as thin as possible, while still providing complete coverage of the surface, for example having a thickness of only a few (such as 1-10 μm) microns. The intermediate coating 112 may comprise any suitable surface preparation such as, but not limited to paint, a laminate, a deposited (thin) film, anodization, and the like.

In addition to blackbodies (100), similar methods of applying a coating of metallic nanoparticles (and, optionally, an intermediate coating) can be applied to targets (such as in FIG. 2A,B) to increase emissivity and improve radiometric accuracy by limiting errors from reflected sources. Other embodiments (such as embodiments described in FIGS. 2,3,4,5,6) disclosed herein may also benefit from the coatings 110 and 112 described herein.

The coating methods described above may also be applied to surfaces or objects that are not temperature controlled. For example, extended area blackbodies are often used in conjunction with targets to produce test images with a desired thermal difference or contrast. The targets are typically uncontrolled, though their temperature is measured. They are then back illuminated with an extended area blackbody with the blackbody's set point at a desired temperature difference from that of the target.

FIGS. 2A and 2B show an example of a target plate 200 comprising a target base 202. In this example a four bar target commonly used for minimum resolvable temperature difference tests is shown. However, this concept may be applied to any target shape. A coating 210 (compare 110) of nanoparticles may be disposed on the front surface of the target base 202. An intermediate coating (or layer) 212 (compare 112) of high, but not near unity emissivity material such as paint may (optionally) be disposed on the front surface of the target base 202 between the target base 202 and the layer 210 of nanoparticles.

The target base 202 is typically made of a material with high thermal conductivity, such as copper. The target may be round, rectangular or have any other regular or irregular shape. Typical thicknesses of the target base range from 0.05 to 0.5 inches (1.2-13 mm), though base thicknesses outside this range are possible. For simplicity FIG. 2 shows a monolithic base. However, targets may be made with a thicker base with enlarged holes of the target and then have a thin sheet with the precise target shape bonded to the base. This invention applies to such composite targets a well.

Openings 220, such as a number (four shown) of rectangular openings (or slits) laid out parallel with one another, may be provided through the target base 202 and the coatings 210 and 212. In use, the target plate may be disposed in front of a source plate, such as the source plate in FIG. 1. The techniques disclosed herein may be applicable to other uncontrolled surfaces such as ambient radiometric references (plates).

Uniformity

Uniformity is an important parameter of any extended area blackbody, especially when used to calibrate or test an imaging device. In order to maximize uniformity, the source plate is usually made from a material with a high thermal conductivity such as copper or aluminum. Other materials including metal matrix and other composites (such as including graphite), including those with anisotropic thermal conductivities, may be used.

There are two major causes of non-uniformity in a blackbody: (i) the system for applying power to the source and (ii) losses that drain power from the source. In a system with no losses to the environment, a source would have perfect uniformity as no additional power would be required to maintain a temperature and, with no losses, conduction in the source would eventually bring it to a single temperature throughout. For a "real" system, there are inevitably losses or gains, including radiative losses from the active surface of the blackbody, as well as heat gained or lost though the use thermal control devices such as heaters or thermoelectric modules. These gains and losses are typically not applied uniformly across the volume of the blackbody, hence they lead to non-uniformity. For a blackbody based on a plurality of thermoelectric modules (TEMs), the spaces between the modules lead to non-uniformity. In order to achieve acceptable uniformity, the source plate must be thick enough to allow the conduction in the plate so spread the heat from the individual TE modules enough to produce a uniform temperature at the optical surface of the source plate. Unfortunately, one of the other major causes of non-uniformity is thermal losses through the edges of the extended area source. A typical source has a thermal input on the side (back) opposite the side (front) which is to be viewed by the thermal imager or other detector. The edges of the source plate may be insulated, but are typically not controlled and are exposed (through insulation) to the ambient environment.

Edge Losses

FIGS. 3A, 3B illustrate a source plate 300 (or blackbody, controlled radiometric reference) which may be monolithic (one piece), having a highly-uniform (which may be optically-active) area 302 (or highly thermally-uniform area) and a pre-heater area 304 disposed around the periphery (or at least some edges) of the highly-uniform area 302 of the source plate 300. The entire source plate 300, or selected portions (areas) thereof, may be coated, and controlled, as discussed with respect to FIG. 1.

A plurality of thermo-electric modules (TEM) 306 may be disposed on the backside of the source plate 300, under the highly-uniform area 302. A plurality of thermo-electric modules (TEM) 316 may be disposed on the backside of the source plate 300, under the pre-heater area 304. A heat sink 308 may be provided, as discussed with respect to FIG. 1.

Some techniques for limiting edge losses of a blackbody may include reserving an area or adding a separate piece around the edge (periphery) of the active source (optically active area) that is in relatively weak thermal contact with the active area. Such a "pre-heater" piece or area (for example) can be used to improve uniformity by being controlled to a temperature close to that of the optically active area 302, which may limit the losses of the optically active area. Thermo-electric modules (TEM) 306 (or other heating/cooling sources, shown in dashed lines) may be disposed on the back surface of the source plate 300, on the opposite side of the source plate 300 from the optically active area 302. A peripheral area or piece around the optically-active area may comprise the same or a different material than the optically-active area. Multiple materials may be used to select the appropriate thermal conductance between the two areas.

Weakly-Coupled Edge

FIG. 4A illustrates a controlled radiometric reference (i.e., blackbody) 400 comprising a source plate having an inner optically-active area 402 (compare 302) and a weakly-coupled edge portion 404 (in the manner of a frame) disposed around the periphery of the active area 402. Heaters 406 (compare TEM 306) may be disposed on the back side of the optically-active area 402 for thermal control. In this example, the source plate (400) may be modified to limit edge losses without requiring a pre-heater area (such as 304) and a separate thermal control (FIG. 3). Coatings (compare 110, 112) and a heat sink (compare 108) may be included, but are omitted, for illustrative clarity.

In this example, the source plate 402 may be modified to include a deep groove 420 cut around the outside (periphery) of an optically-active area 402, forming a weakly-coupled edge (or frame) 404 around the periphery of the optically-active area 402. The groove 420 extends into the front surface of the overall source plate, towards the back surface thereof, around a periphery of the optically active area, separating the thermally-controlled, optically-active area from a surrounding weakly-coupled (not thermally-controlled) edge portion 404 of the overall source plate.

The weakly-coupled edge 404 may be linked to the optically-active area 404 by a thin bridge (or web) of material 414. This weakly-coupled edge 404 may be thermally tied (connected) to the source plate 402 at the back side of the source plate, opposite the active (front) side. Tying the edges at the back side (rather than at another position, such as at the front side) may allow the source plate to equilibrate through its thickness better than if the losses were distributed along the entire exposed edge.

A typical blackbody 400 may be square, measuring 15×15 cm (6"×6"), may be 1.25 cm (½") thick. The groove 414 may be 0.25 cm (0.1") wide, 1 cm (⅜") deep and be disposed 0.6 cm (¼") from the outer edge of the blackbody 400. All dimensions set forth herein are approximate.

The groove 420 is shown extending into the blackbody 400 from the front surface thereof, nearly to the back surface thereof, and may be either continuous or discontinuous. Alternatively or additionally, a series of holes or slots may extend completely through the plate, perforating the bridge, to further isolate the weakly-coupled edge from the optically active surface.

FIG. 4B shows that a plurality of holes 415 may be provided, through the blackbody 400, as an alternative to or in addition to a groove (420, shown by dashed lines in FIG. 4B).

Thermometric Calibration System

Blackbodies, or similar devices, are at times used for thermometric calibration of temperature probes. In such cases the system becomes a uniform thermal source for probe calibration, where the source plate acts as a uniform thermal well. Some of the techniques described herein can be applied (adapted) to a specialized system for thermometric calibration. In such cases the system may be optimized for thermometric uniformity within the thermal well and not for radiometric output.

FIG. 5 is shows a system (set-up) 500 for calibrating temperature probes. In this embodiment, the blackbody may be considered to be (or may comprise) a thermometric reference. A "calibration" thermal well 502 (thermometric reference) may be disposed in a highly insulating area such as an evacuated Dewar (a vacuum-insulated container used to maintain internal temperature for extended periods) 504, or other insulated body. The source plate 502 may comprise a highly conductive material such as copper, or aluminum or a composite such as copper-graphite or aluminum-graphite. The calibration plate (thermal well, source plate) 502 may have two opposite "ends" (left and right, as viewed).

Thermal sources (TEM) 506 may be disposed on one portion (left, as viewed) of the calibration plate (thermal well) 502, and may be disposed on both the front and back surfaces of the calibration plate (thermal well) 502. Thermal sources 506 may also be disposed on all sides (top and bottom, left and right in the figure) of the calibration plate (thermal well) 502. For instance, the calibration plate (thermal well) 502 may be square in cross-section and the sources disposed on all four sides of the calibration plate (thermal well) 502. The high thermal conductivity of the calibration plate (thermal well) 502 material may significantly reduce (including substantially remove) any non-uniformity introduced by the thermal sources.

A reference probe 510 is shown positioned on or above the front surface of the source plate (thermal well) 502, on the left (as viewed) portion of the source plate (thermal well) 502. The reference probe 510 may be buried within the body of the source plate (thermal well) 502. A control probe 508 (shown as a black dot) may be located near the thermal sources 506 (TEM).

The control probe 508 is typically a probe with fast thermal response and good thermal resolution but may sacrifice absolute accuracy, for example a calibrated thermistor. The reference probe 510 may have high absolute accuracy, but may have a slow response, for example, a standard platinum resistor thermometer. The control probe 508 may be used to control the well temperature to a point within a desired range of a calibration point. The reference probe 510 may then be used to accurately measure the absolute well temperature (temperature of the thermal well, source plate). A computer (not shown, see 630, for example) manages the operation of the thermal sources 506, the reference probe 510 and the control probe 508, and other active thermal elements described herein.

In order to limit losses to the environment, a pre-heater plate (or body) 520 may be introduced between the source plate (thermal well) 502 for calibration and the ambient environment. The pre-heater plate 520 may be disposed closely adjacent to, and in-plane (coplanar) with the source plate (thermal well) 502. The pre-heater plate 520 may have an independent temperature control and may be weakly-coupled, such as by stainless steel tubes, to both the probe housings and the calibration source plate (thermal well) 502. The pre-heater plate 520 may be controlled to at or near the same temperature as the calibration thermal well 502. (This embodiment builds upon the concept of a weakly-coupled edge area such as described with respect to FIGS. 3 and 4, particularly the weakly-coupled edge 404 of FIG. 4.)

The pre-heater plate 520 may be joined to the calibration well (thermal well) 502 using a structure with low thermal conductance relative to the calibration well and pre-heater structures, such as the aforementioned stainless steel tubes 526, which may be brazed to one of the well and the pre-heater and sliding into a hole in the other of the thermal well 502 and the pre-heater plate 520 so that the pre-heater plate 520 may "float" relative to the thermal well 502.

The pre-heater plate 520 is shown, joined to the source plate 502 at an end (right, as shown) of the source plate 502 which is opposite to that (left) of the reference probe 510 and control probe 508. Pre-heater thermal sources (TEM) 522 and control probe 524 (shown as a black dot) are disposed in any suitable manner on (or in) the pre-heater plate 520. The pre-heater plate 520 may be joined (connected), in any suitable manner, such as by stainless steel tubes 526 to the source plate 502. Stainless steel has low thermal conductivity. The pre-heater plate 520 may comprise a material similar to that of the calibration plate 502. Thermal sources 522 may also be disposed on all sides (top and bottom, left and right in the figure) of the pre-heater plate 520.

Two stainless steel tubes 526 are shown, with the two calibration probes 530*a* and 530*b* (which may collectively be referred to as "530") passing through them. The calibration probes 530 (probes to be calibrated) may pass through the pre-heater plate 520, through the stainless steel tubes 526, and into the calibration plate 502. One or more (two shown) temperature probes 530 to be calibrated may be disposed on (or above) the (right) end portion of the source plate 502, or may pass through (into the bodies of) the pre-heater plate 520 and calibration well (source plate) 502.

It may be noted that the reference probe 510 is relatively long, and the calibration probes (probes to be calibrated) 530 are relatively short. The actual measurement point on the probes is usually near their ends (the right end of the reference probe 510 and the left ends of the calibration probes 530, as viewed in the figure), and it is desirable to keep the ends of the calibration probes (probes to be calibrated) 530 and the reference probe 510 as close to one another as possible in the thermal well 502. The end of the reference probe 510 extends to a given position within the source plate (thermal well), and the end(s) of the probes(s) to be calibrated 530 also extend substantially to the given position. The ends (tips) of the probes should be maintained as close as practical, with some copper (source plate material) in-between so that temperature equalizes around each probe. In the figure, the calibration probe(s) 530 are shown parallel to and entering the source plate (calibration well) 502 from opposite ends thereof, their tips being close to one another at a given position within the source plate. Depending on the size and geometry of the source plate, (thermal well) the angles and orientations of the probes 510 and 530 may be other than as shown.

The combination of small temperature difference and weak thermal contact between the two bodies (the calibration source plate 502 and the pre-heater plate 520) may prevent significant thermal losses from the calibration source plate 502 to the ambient environment through the pre-heater plate 520. The pre-heater plate 520 also brings the housings of the probes 530 to a temperature near the calibration temperature, and thus may reduce the introduction of non-uniformity through stem conduction of the probes 530 undergoing calibration. The pre-heater plate 520 is designed to bring the temperature of the probes 530 to almost the exact same as the well so there is no significant heat transfer through the probes 530.

Radiometric Accuracy

Most extended area blackbodies have temperature measurement within the source plate that acts as the thermal source to be viewed. For radiometric accuracy, the temperature and emissivity of that surface must be known as well as the thermal irradiance on the surface if the emissivity is not unity. Temperature measurement at the surface is difficult due to numerous factors including locating the probe on the surface without introducing local non-uniformity around the probe, preventing local air currents from affecting the control probe. Measuring the temperature in the body of the source plate is easier, but does not provide an accurate surface temperature.

One way to obtain a more accurate surface temperature is to measure both the temperature of the body and that of the ambient environment. If the difference between the surface and the body measurement is known, a reasonably accurate surface temperature can be calculated. This improvement comprises using an ambient probe attached to the blackbody or placed nearby to measure the temperature of the ambient environment, and software to compensate for the environment, to give a desired surface radiance by compensating for both the difference between the surface temperature and the control probe as well as the non-unity emissivity of the surface. The probe may be a thermometric probe or a radiometric probe, or a combination of the two may be used.

FIG. 6 is a cross-sectional view of a system (set-up) 600 for compensating for ambient temperature, showing a source plate 602 with thermal sources (TEM) 606 on its back surface, a control probe 610 associated with the source plate (for measuring the temperature of the source plate), and an external probe 620 located near the source plate for measuring ambient temperature. A heat sink 608 (compare 108) may be provided, as shown. A housing 618 may be provided, as shown.

The probes 610 and 620 are shown connected to a computer 630 for making the calculations taking into account the temperature gradient. The computer 630 may be referred to as "means for calculating", "means for making calculations", or similar. For example, when the blackbody is at a high temperature, and the ambient temperature is lower, the difference can be taken into account and used to offset the effects of the ambient temperature. The ambient probe 620 measures the thermometric temperature of the ambient air, and a control algorithm may be used to compensate for that effects of the air temperature. The ambient probe 620 measures the average infrared radiation and the algorithm may compensate for the ambient radiation reflected off the blackbody surface. In this regard, the computer 630 may be considered to be (in conjunction with the ambient probe) "means for compensating" for ambient temperature.

The ambient probe may measure either the thermometric temperature of the ambient air, the radiative load on the blackbody surface, or both, and compensates for either or both, if they are measured.

While the invention(s) has/have been described with respect to a limited number of embodiments, these should not be construed as limitations on the scope of the invention(s), but rather as examples of some of the embodiments. Those skilled in the art may envision other possible variations, modifications, and implementations that are also within the scope of the invention(s), based on the disclosure(s) set forth herein.

What is claimed is:

1. Apparatus capable of functioning as a thermometric reference comprising:
   a thermal well;
   first thermal sources disposed on the thermal well;
   a first control probe located near the first thermal sources;
   a reference probe extending to a given position within the thermal well;
   a pre-heater plate disposed adjacent to the thermal well;
   second thermal sources disposed on the pre-heater plate; and
   a second control probe located near the second thermal sources;
   structures with low thermal conductance joining the pre-heater plate to the thermal well;
   wherein at least one probe to be calibrated extends through the pre-heater plate into the thermal well, and extends to the given position within the thermal well.

2. The apparatus of claim 1, wherein:
   the structures with low thermal conductance are joined to either the thermal well or the pre-heater plate and extend into a hole in the other of the thermal well and the pre-heater plate.

3. The apparatus of claim 1, wherein:
   the structures comprise stainless steel tubes.

4. The apparatus of claim 1, wherein the thermal well comprises a conductive material selected from the group consisting of copper, aluminum, copper-graphite and aluminum-graphite.

5. The apparatus of claim 1, wherein:
   the first control probe has a faster response than the reference probe, and the reference probe has a higher absolute accuracy than the control probe.

6. The apparatus of claim 1, wherein, at least one of:
   the control probe comprises a calibrated thermistor; and
   the reference probe comprises a platinum resistor thermometer.

7. The apparatus of claim 1, wherein:
   the pre-heater plate is disposed coplanar with the thermal well.

8. The apparatus of claim 1, wherein:
   the pre-heater plate has an independent temperature control.

9. The apparatus of claim 8, wherein:
   the pre-heater plate is controlled to at or near the same temperature as the thermal well.

10. The apparatus of claim 1, wherein:
    an end of a probe to be calibrated, when extending through the pre-heater plate into the thermal well, is positioned close to an end of the reference probe in the thermal well.

11. The apparatus of claim 1, wherein:
    an end of the at least one probe to be calibrated extends to the given position in the thermal well.

12. The apparatus of claim 1, wherein:
    at least two probes to be calibrated extend through the pre-heater plate into the thermal well for calibration.

13. Apparatus capable of functioning as a thermometric reference comprising:
    a reference probe extending to a first position within a thermal well;
    a pre-heater plate disposed adjacent to the thermal well; and
    at least one probe to be calibrated extending through the pre-heater plate into the thermal well, and extending to the first position within the thermal well;
    wherein the thermal well comprises a source plate, and further comprising:
    a groove or perforations extending into a front surface of the source plate to define a thermally-controlled, optically-active area surrounded by an edge portion of the source plate which is connected by bridges to the optically-active area at the back of the source plate.

14. Apparatus for thermometric calibration of temperature probes, comprising:
    a thermal well;
    first thermal sources disposed on the thermal well;
    a first control probe located near the first thermal sources;
    a reference probe extending to a given position within a the thermal well;
    a pre-heater plate disposed adjacent to the thermal well;
    second thermal sources disposed on the pre-heater plate;
    a second control probe located near the second thermal sources; and
    structures with low thermal conductance joining the pre-heater plate to the thermal well;
    wherein at least one probe to be calibrated extends through the pre-heater plate into the thermal well, and extends to the given position within the thermal well.

15. The apparatus of claim 14, wherein:
    the apparatus is disposed in a vacuum-insulated container.

16. The apparatus of claim 14, wherein:
    the structures with low thermal conductance are joined to either the thermal well or the pre-heater plate and extend into a hole in the other of the thermal well and the pre-heater plate.

17. The apparatus of claim 14, wherein:
    the thermal well comprises a conductive material selected from the group consisting of copper, or aluminum or a composite such as copper-graphite and aluminum-graphite.

18. The apparatus of claim 14, wherein:
the control probe has a faster response than the reference probe, and the reference probe has a higher absolute accuracy than the control probe.

19. The apparatus of claim 14, wherein at least one of:
the control probe comprises a calibrated thermistor; and
the reference probe comprises a platinum resistor thermometer.

20. The apparatus of claim 14, wherein:
at least two probes to be calibrated extend through the pre-heater plate into the thermal well for calibration.

* * * * *